United States Patent
Park et al.

(10) Patent No.: US 12,012,543 B2
(45) Date of Patent: Jun. 18, 2024

(54) COMPOSITE MATERIAL

(71) Applicant: LG CHEM, LTD., Seoul (KR)

(72) Inventors: Sai Bom Park, Daejeon (KR); Jin Kyu Lee, Daejeon (KR)

(73) Assignee: LG Chem, LTD., Seoul (KR)

( * ) Notice: Subject to any disclaimer, the term of this patent is extended or adjusted under 35 U.S.C. 154(b) by 587 days.

(21) Appl. No.: 16/651,109

(22) PCT Filed: Oct. 26, 2018

(86) PCT No.: PCT/KR2018/012781
§ 371 (c)(1),
(2) Date: Apr. 10, 2020

(87) PCT Pub. No.: WO2019/083311
PCT Pub. Date: May 2, 2019

(65) Prior Publication Data
US 2020/0263070 A1    Aug. 20, 2020

(30) Foreign Application Priority Data
Oct. 27, 2017    (KR) ........................ 10-2017-0141254

(51) Int. Cl.
| | |
|---|---|
| C09K 5/14 | (2006.01) |
| C08J 5/18 | (2006.01) |
| C08K 3/22 | (2006.01) |
| C08K 3/38 | (2006.01) |
| C08K 7/04 | (2006.01) |
| F28F 21/06 | (2006.01) |

(52) U.S. Cl.
CPC ............... C09K 5/14 (2013.01); C08J 5/18 (2013.01); C08K 3/22 (2013.01); C08K 3/38 (2013.01); C08K 7/04 (2013.01); F28F 21/067 (2013.01); *C08J 2383/04* (2013.01); *C08K 2003/2272* (2013.01); *C08K 2003/385* (2013.01); *C08K 2201/001* (2013.01); *C08K 2201/005* (2013.01); *C08K 2201/01* (2013.01); *C08K 2201/011* (2013.01); *F28F 2255/06* (2013.01)

(58) Field of Classification Search
CPC ............ C09K 5/14; C08K 2201/001; C08K 2201/01; C08K 2201/005; C08K 2201/004; C08K 2201/016; C08K 3/13; C08K 3/22; C08K 3/38; C08K 3/08; C08K 3/41; C08K 3/34; C08K 3/28; C08K 7/04; C08K 9/02; F28F 2255/06
USPC ...................................................... 428/220
See application file for complete search history.

(56) References Cited

U.S. PATENT DOCUMENTS

| | | | |
|---|---|---|---|
| 6,837,306 B2 | 1/2005 | Houle et al. | |
| 9,017,570 B2 | 4/2015 | Kwak et al. | |
| 2002/0090501 A1 | 7/2002 | Tobita | |
| 2013/0299732 A1 | 11/2013 | Kwak et al. | |
| 2013/0309485 A1 | 11/2013 | Takayama et al. | |
| 2015/0101352 A1 | 4/2015 | Kwak et al. | |
| 2018/0249593 A1* | 8/2018 | Zhang | ................ H01L 23/3733 |

FOREIGN PATENT DOCUMENTS

| | | |
|---|---|---|
| CN | 105733065 A | 7/2016 |
| JP | 2001-168573 | 6/2001 |
| JP | 2004315761 A | 11/2004 |
| JP | 2012522884 A | 9/2012 |
| JP | 2013-143439 | 7/2013 |
| JP | 2015105282 A | 6/2015 |
| JP | 2017155226 A * | 9/2017 |
| KR | 2002-0046338 | 6/2002 |
| KR | 10-1003840 | 12/2010 |
| KR | 10-1417270 | 7/2014 |
| KR | 10-2015-0055173 | 5/2015 |
| KR | 10-2015-0043733 | 4/2016 |
| KR | 10-1679698 | 11/2016 |
| WO | 2015016221 A1 | 2/2015 |

OTHER PUBLICATIONS

Hong "Effective Assembly of Nano-Ceramic Materials for High and Anisotropic Thermal Conductivity in a Polymer Composite." Polymers 2017, 9, 413 (Year: 2017).*
International Search Report corresponding to PCT/KR2018/012781, mailed Jan. 18, 2019 (5 pp, including English translation).
Database WPI, Week 201515, Thomson Scientific, London, England, AN 2015-115117 (4 pages), pub 2015.
Database WPI, Week 201541, Thomson Scientific, London, England, AN 2015-329497 (2 pages), pub 2015.
Extended European Search Report corresponding to EP 18870430.8; dated Sep. 8, 2020 (10 pages).
Kim, Kiho , et al., "Magnetic aligned AlN/epoxy composite for thermal conductivity enhancement at low filler content", Composites Part B, 93, 2016, 67-74.
Kim, Kiho , et al., "Vertical filler alignment of boron nitride/epoxy composite for thermal conductivity enhancement via external magnetic field", International Journal of Thermal Sciences, 100, 2016, 29-36.
Ngo, Ich-Long, et al., "Thermal conductivity of transparent and flexible polymers containing fillers: A literature review", International Journal of Heat and Mass Transfer. 98: 219-226 (2016).

* cited by examiner

*Primary Examiner* — Tri V Nguyen
(74) *Attorney, Agent, or Firm* — SALIWANCHIK, LLOYD & EISENSCHENK

(57) ABSTRACT

The present application provides a composite material and a method for producing the same. The present application can provide a composite material having excellent other necessary properties such as impact resistance or processability, as well as excellent heat conduction characteristics as a tight heat transfer network is formed therein by an anisotropic heat-conductive filler.

13 Claims, 3 Drawing Sheets

COMPOSITE MATERIAL

CROSS REFERENCE TO RELATED APPLICATIONS

This application is a 35 U.S.C. § 371 national stage application of PCT International Application No. PCT/KR2018/012781, filed Oct. 26, 2018, which claims priority from Korean Patent Application No. 10-2017-0141254, filed Oct. 27, 2017, the contents of which are incorporated herein in their entireties by reference. The above-referenced PCT International Application was published in the Korean language as International Publication No. WO 2019/083311 on May 2, 2019.

TECHNICAL FIELD

The present application is directed to a composite material.

BACKGROUND ART

Heat-dissipating materials can be used in various applications. For example, since batteries and various electronic apparatuses generate heat during operation, a material capable of effectively controlling such heat is required.

As materials having good heat dissipation properties, ceramic materials having good thermal conductivity and the like have been known, but since such materials have poor processability, a composite material produced by blending the ceramic filler or the like in a polymer matrix can be used.

However, since a large amount of filler components must be applied in order to secure high thermal conductivity by the above method, various problems arise.

DISCLOSURE

Technical Problem

The present application relates to a composite material and in one example, it is intended to provide a composite material ensuring excellent other properties such as impact resistance or processability while having excellent heat conduction characteristics, or a method for producing the same.

Technical Solution

The present application relates to a composite material. In the present application, the term composite material may mean a material comprising at least a polymer component (polymer matrix) and a thermal conductor. In one example, the composite material may be in the form of a film.

In the present application, especially in the film-shaped composite material, high thermal conductivity can freely be secured in a desired direction including the thickness direction of the film form.

In the conventionally known thermally conductive composite material, it is difficult to secure high thermal conductivity in a specific target direction even though it is possible to secure high thermal conductivity as a whole.

For example, although a variety of film-shaped composite materials have been known, it has been impossible to obtain the desired thermal conductivity in the thickness direction of the film form under the minimum thermal conductor ratio. However, the composite material can secure high thermal conductivity in a desired direction such as a thickness direction even when a small amount of thermal conductor is applied.

In the case of the film form, its thickness and the like can be adjusted in consideration of the desired thermal conductivity or use, and the like. The thickness of the film may be, for example, about 10 μm or more, about 20 μm or more, about 30 μm or more, about 40 μm or more, about 50 μm or more, about 60 μm or more, about 70 μm or more, about 80 μm or more, about 90 μm or more, about 100 μm or more, 110 μm or more, 120 μm or more, 130 μm or more, 140 μm or more, 150 μm or more, 160 μm or more, 170 μm or more, 180 μm or more, 190 μm or more, 200 μm or more, 300 μm or more, 400 μm or more, 500 μm or more, 600 μm or more, 700 μm or more, 800 μm or more, 900 μm or more, or 950 μm or more. The upper limit of the thickness of the film is controlled depending on the purpose, which is not particularly limited, but may be, for example, about 10,000 μm or less, about 9,000 μm or less, about 8,000 μm or less, about 7,000 μm or less, about 6,000 μm or less, about 5,000 μm or less, about 4,000 μm or less, about 3,000 μm or less, about 2,000 μm or less, or about 1,500 μm or less or so.

In this specification, the thickness may be a minimum thickness, a maximum thickness, or an average thickness of a subject when the thickness of the subject is not constant.

In the present application, the thermal conductor is oriented in the polymer matrix in a specific manner to form a heat conduction path. Accordingly, the composite material of the present application can secure excellent heat conduction characteristics while minimizing the ratio of the thermal conductor. Therefore, it is possible to secure the desired thermal conductivity without damaging other necessary properties such as impact resistance or processability. Furthermore, it is possible to control the heat conduction path through the control of the orientation direction during the orientation, and accordingly, it is possible to realize high thermal conductivity in the desired direction.

The kind of the polymer matrix applied in the present application is not particularly limited. For example, a material which had been blended as a binder with an existing ceramic filler or the like to form a heat-dissipating film or the like can be used equally.

Such a material can be exemplified by one or more selected from the group consisting of an acrylic resin, a silicone resin, an epoxy resin, a urethane resin, an amino resin, a polyester, an olefin resin and a phenol resin, but is not limited thereto.

On the other hand, the thermal conductor that forms a heat transfer path in the state maintained in the polymer matrix comprises an anisotropic heat-conductive filler (hereinafter, may be referred to as a magnetic composite filler, a first anisotropic heat-conductive filler or a first filler) which is combined with a magnetic body and an anisotropic heat-conductive filler (hereinafter, may be referred to as a second anisotropic heat-conductive filler or a second filler) which is not combined with a magnetic body simultaneously.

By using these two types of fillers, a close heat conduction path can be effectively formed in the polymer matrix.

For example, in the polymer matrix, the magnetic composite filler may form a heat transfer path in a state of being oriented in a predetermined direction. That is, the composite material of the present application can be formed by a method to be described below, that is, a method of curing a precursor of a polymer matrix in a state where a magnetic field is applied to a precursor in a predetermined direction, where the magnetic composite filler has magnetism and anisotropy, and thus may be fixed in the polymer matrix in a state of being oriented along the direction of the applied magnetic field to form a heat transfer path. In addition, since the thermal conductor also comprises a filler that is not combined with the magnetic body, that is, a filler without magnetism, such fillers are not affected by the applied magnetic field, and thus, connect again between the heat transfer paths formed by the magnetic composite filler, and finally, the heat transfer paths that are closely connected to each other can be formed. An example of such a structure is shown in FIG. 2.

In the structure of FIG. 2, the film-shaped composite material is in the film form, wherein the first filler is oriented along the substantially vertical direction (Z-axis direction), that is, the thickness direction of the film form, to form heat transfer paths. As illustratively shown in FIG. 2, the second filler forms a network shape by connecting the heat transfer paths along the thickness direction formed by the first filler. Here, the second filler is present in a direction substantially perpendicular to the thickness direction, i.e., the horizontal direction, and simultaneously connects the heat transfer paths by the first filler.

Through the formation of such heat transfer paths, it is possible to produce a film-shaped composite material that high thermal conductivity is secured even in the thickness direction.

The composite material can exhibit excellent thermal conductivity in all directions by such a unique structure. For example, the composite material may have thermal conductivity of about 0.3 W/mK or more, about 0.4 W/mK or more, 0.45 W/mK or more, 0.5 W/mK or more, 0.55 W/mK or more, 0.6 W/mK or more, 0.7 W/mK or more, 0.75 W/mK or more, 0.8 W/mK or more, 0.85 W/mK or more, 0.9 W/mK or more, 0.95 W/mK or more, 1 W/mK or more, 1.5 W/mK or more, 2 W/mK or more, 2.5 W/mK or more, 3 W/mK or more, 3.5 W/mK or more, 4 W/mK or more, 4.5 W/mK or more, or 5 W/mK or more. As the composite material has higher thermal conductivity, the composite material may have an excellent thermal control function, whereby the thermal conductivity is not particularly limited, and in one example, it may be about 100 W/mK or less, 90 W/mK or less, 80 W/mK or less, 70 W/mK or less, 60 W/mK or less, 50 W/mK or less, 40 W/mK or less, 30 W/mK or less, 20 W/mK or less, or 10 W/mK or less. The thermal conductivity can be measured by the method described in examples to be described below.

On the other hand, the thermal conductivity may be thermal conductivity in a direction indicating the highest thermal conductivity in the relevant composite material, thermal conductivity in a direction indicating the lowest thermal conductivity in the relevant composite material, or the average value (arithmetic mean) of the highest thermal conductivity and the lowest thermal conductivity.

Furthermore, in one example, the thermal conductivity may be thermal conductivity in the vertical direction (Z-axis direction=thickness direction) when the composite material is in the above-described film form.

Among physical properties mentioned in this specification, when the measured temperature affects relevant physical properties, the physical properties are physical properties measured at room temperature, unless otherwise specified. The term normal temperature is a natural temperature without warming or cooling, and for example, may mean a temperature in a range of about 10° C. to 30° C., about 23° C. or about 25° C. or so.

In addition, among physical properties mentioned in this specification, when the measured pressure affects relevant physical properties, the physical properties are physical properties measured at normal pressure, that is, at atmospheric pressure (about 1 atm or so), unless otherwise specified.

In the present application, by using the anisotropic heat-conductive filler to closely form the heat transfer network as described above, excellent heat conduction characteristics can be secured while using a very small amount of filler.

For example, the volume ratio of the thermal conductors contained in the composite material may be 60 vol % or less. In the composite material of the present application, the appropriate thermal conductivity can be effectively secured in a desired direction under the above ratio. The volume ratio is a value obtained by converting the density and the applied weights of the materials of the applied composite material, for example, the polymer matrix, the first and second fillers, and the like. In another example, the volume ratio may be about 59 vol % or less, 58 vol % or less, 57 vol % or less, 56 vol % or less, 55 vol % or less, 54 vol % or less, 53 vol % or less, 52 vol % or less, 51 vol % or less, or 50 vol % or less, and also, may be about 10 vol % or more, 15 vol % or more, 20 vol % or more, 25 vol % or more, 30 vol % or more, 35 vol % or more, 40 vol % or more, 41 vol % or more, 42 vol % or more, 43 vol % or more, 44 vol % or more, 45 vol % or more, 46 vol % or more, 47 vol % or more, 48 vol % or more, 49 vol % or more, or 50 vol % or more. When the thermal conductors are applied in excess of the volume ratio, inadequate defects such as cracks may occur. Also, in one example, the ratio of the total volume of the first and second fillers in the entire thermal conductor may be about 80 vol % or more, about 85 vol % or more, about 90 vol % or more, or about 95 vol % or more, or may be about 100 vol %. That is, all of the thermal conductors in the composite material of the present application may be the first and second fillers, or may also comprise fillers other than the first and second fillers. In addition, the ratio can be adjusted in consideration of the desired thermal conductivity or direction.

Under such a ratio, the ratio (V1/V2) of the volume (V1) of the first filler to the volume (V2) of the second filler may be about 3 or less. In another example, the ratio may be about 2.5 or less, about 2 or less, about 1.5 or less, about 1 or less, about 0.5 or less, or about 0.3 or less, and also, may be about 0.01 or more, about 0.05 or more, about 0.1 or more, about 0.15 or more, or about 0.2 or more. While the heat transfer paths capable of securing a desired thermal conductivity in a desired direction are formed under such a ratio, a composite material free from defects such as surface cracks can be formed.

The anisotropic heat-conductive filler applied in the present application may mean a filler having excellent thermal conductivity and proper anisotropy.

The filler may have thermal conductivity of about 1 W/mK or more, about 5 W/mK or more, about 10 W/mK or more, or about 15 W/mK or more. The thermal conductivity of the thermally conductive filler may be about 400 W/mK or less, about 350 W/mK or less, or about 300 W/mK or less. The kind of the thermally conductive filler is not particularly limited, and for example, a ceramic filler or a carbon-based filler, and the like can be applied. Such a filler can be exemplified by alumina, aluminum nitride (AlN), boron nitride (BN), silicon nitride, silicon carbide (SiC), beryllium oxide (BeO), and the like, or a filler such as carbon nanotube, carbon black, graphene, graphene oxide or graphite, but is not limited thereto.

The filler has anisotropy. That is, the filler may have a high aspect ratio, such as a fiber form. For example, the filler may have an aspect ratio of about 5 or more, 10, 15, 20, about 25, about 30 or about 35 or more. In the fiber-shaped filler, the aspect ratio is a ratio (L/D) of the length (L) to the diameter (D) of the cross section (cross section in the direction perpendicular to the longitudinal direction). In another example, the aspect ratio (L/D) may be about 100 or less, about 95 or less, about 90 or less, about 85 or less, about 80 or less, about 75 or less, about 70 or less, about 65 or less, about 60 or less, about 55 or less, or about 50 or less. Under this aspect ratio, the formation of an appropriate heat transfer network can be expected.

In one example, the anisotropic heat-conductive filler may have a cross-sectional length, that is, an average diameter (D) of a cross section in a direction perpendicular to the longitudinal direction in a range of about 1 μm to 100 μm, and under such a range, the excellent heat transfer paths can be formed. The length of the cross section may be about 2 μm or more, 3 μm or more, 4 μm or more, 5 μm or more, 6 μm or more, 7 μm or more, 8 μm or more, 9 μm or more, or 10 μm or more, or may be 90 μm or less, 85 μm or less, 80 μm or less, 75 μm or less, 70 μm or less, 65 μm or less, 60 μm or less, 55 μm or less, 50 μm or less, 40 μm or less, 35 μm or less, 30 μm or less, 25 μm or less, 20 μm or less, or 15 μm or less.

In the magnetic composite filler, the kind of the magnetic body to be combined with the anisotropic heat-conductive filler as above is not particularly limited. For example, the magnetic body can be exemplified by iron oxide such as $Fe_2O_3$ and $Fe_3O_4$, ferrite ($MO \cdot Fe_2O_4$, M is Mn, Zn, Mg, Fe, Cu, Co or the like) or alloy nanoparticles such as FePt, CoPt, Ni—Zn and Mn—Zn, and the like.

The size of the magnetic body as above is adjusted depending on the purpose, which is not particularly limited. In one example, as the magnetic body, a magnetic body in the form of particles can be applied, and the average particle diameter may be in a range of about 10 nm to 1,000 μm. In another example, the average particle diameter may be about 20 nm or more, 30 nm or more, 40 nm or more, 50 nm or more, 60 nm or more, 70 nm or more, 80 nm or more, 90 nm or more, or 100 nm or more, and also, may be 900 μm or less, 800 μm or less, 700 μm or less, 600 μm or less, 500 μm or less, 400 μm or less, 300 μm or less, 200 μm or less, 100 μm or less, 90 μm or less, 80 μm or less, 70 μm or less, 60 μm or less, 50 μm or less, 40 μm or less, 30 μm or less, 20 μm or less, 10 μm or less, 1 μm or less, or 0.5 μm or less or so.

In the present application, the method of forming the magnetic composite filler by combining the anisotropic heat-conductive filler and the magnetic body as above is not particularly limited. In this field, considering the material of the filler and the magnetic body, various methods of combining the two are known and all of these methods can be applied in the present application. For example, a method of mixing the filler in a state where it is applied to acid treatment such as hydrochloric acid to activate surface functional groups with the magnetic body and treating the mixture with complexation or the like can be used.

In the magnetic composite filler combined in such a manner, i.e., the first filler, 10 to 200 parts by weight of the magnetic body may be contained relative to 100 parts by weight of the anisotropic heat-conductive filler. In another example, the ratio may be about 20 parts by weight or more, 30 parts by weight or more, 40 parts by weight or more, or 50 parts by weight or more, or may be about 190 parts by weight or less, 180 parts by weight or less, about 170 parts by weight or less, about 160 parts by weight or less, about 150 parts by weight or less, about 140 parts by weight or less, about 130 parts by weight or less, about 120 parts by weight or less, about 110 parts by weight or less, about 100 parts by weight or less, about 90 parts by weight or less, about 80 parts by weight or less, or about 70 parts by weight or less. However, this ratio can be appropriately selected in consideration of the kind of the magnetic body, or an intensity of a magnetic field applied in a production method, which is described below, and the like.

The present application also relates to a method for producing a composite material, for example, such a composite material.

The above production method can be performed using a mixture comprising a curable precursor of the above-mentioned polymer matrix, a magnetic composite filler and an anisotropic heat-conductive filler not combined with a magnetic body.

The kind of the curable precursor of the polymer matrix applied in the mixture is not particularly limited, where known materials known to be capable of forming the above-mentioned polymer matrix through a curing process can be used without limitation. These materials are variously known.

In addition, the types and materials of the filler and the like applied to the mixture are also as described above, and the ratio between them can be adjusted so as to secure the above-mentioned ratio.

In the production method of the present application, if necessary, while applying a magnetic field in a state where such a mixture is molded into a desired shape, the precursor is cured to form a polymer matrix. That is, the anisotropic heat-conductive filler combined with the magnetic body by the application of the magnetic field is oriented along the direction of the magnetic field, thereby being fixed by the polymer matrix in a state where the heat transfer paths are formed. At this time, the intensity of the applied magnetic field is not particularly limited, which may be selected in consideration of the desired orientation degree or the kind of the magnetic body, and the like.

In the above processes, the method of curing the curable precursor is also not particularly limited, and a known method depending on the type of the precursor, for example, an appropriate heat application or electromagnetic field irradiation method may be applied.

Advantageous Effects

The present application can provide a composite material having excellent other necessary properties such as impact resistance or processability, as well as excellent heat conduction characteristics as a tight heat transfer network is formed therein by an anisotropic heat-conductive filler.

MODE FOR INVENTION

The present application will be specifically described by way of examples, but the scope of the present application is not limited to the following examples.

Production Example 1. Production of Magnetic Composite Filler (A)

Figure 1:
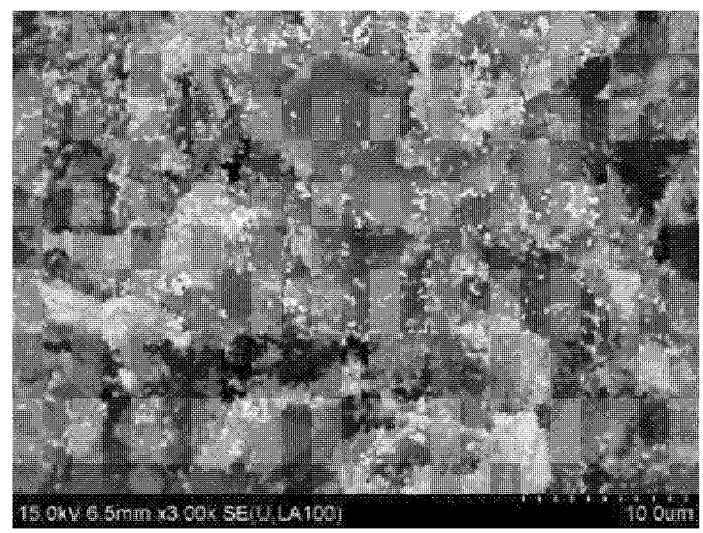
FIG. 1 is a photograph of the magnetic composite filler produced in Production Example 1.

A composite filler was formed by using boron nitride in the form of fibers having an aspect ratio of about 40 or so and an average diameter of the cross section in the direction perpendicular to the longitudinal direction of about 10 μm or so as an anisotropic heat-conductive filler, and using iron oxide (Fe2O3) particles having an average particle diameter in a level of about 100 nm to 200 nm as a magnetic body. The iron oxide particles were immersed in a hydrochloric acid solution at room temperature to activate surface reaction groups. Subsequently, the iron oxide particles with activated surface reaction groups and the boron nitride were dispersed in an aqueous solution at a weight ratio of 10:6 (boron nitride:iron oxide), treated with an ultrasonic wave of 120 W for about 1 hour, and then washed and dried to produce a composite filler. FIG. 1 is a photograph of the composite filler produced above.

Example 1

Figure 2:
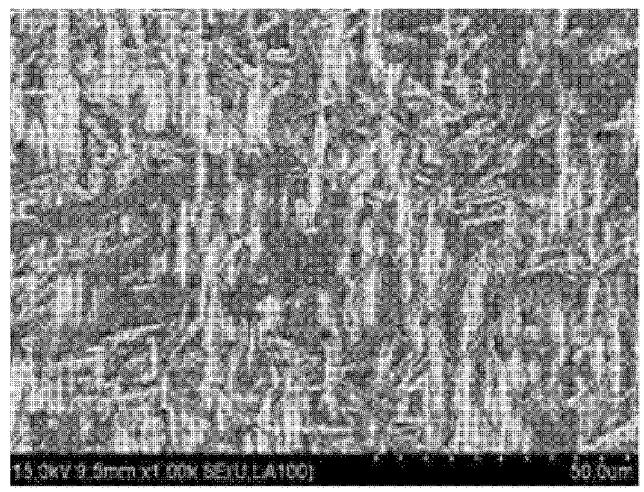
FIGS. 2 and 3 are photographs of the composite materials produced in Examples 1 and 2.
Figure 2:
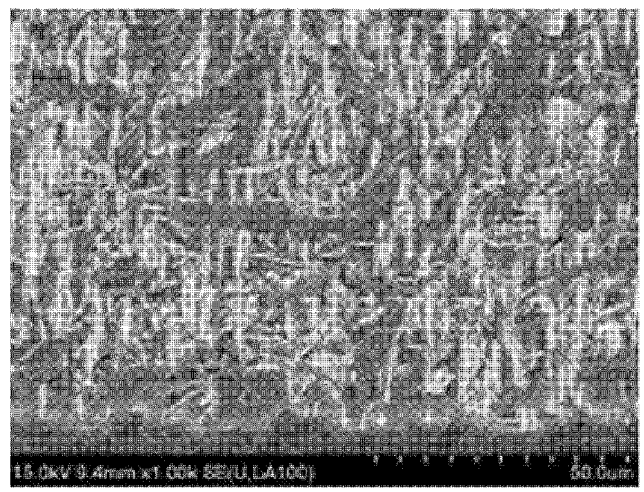

As a curable precursor of a polymer matrix, a thermosetting silicone composition (Dow Corning, Sylgard 184) was used. The curable precursor, the composite filler (first filler) produced in Production Example 1 and boron nitride in the form of fibers having an aspect ratio of about 40 or so and an average diameter of the cross section in the direction perpendicular to the longitudinal direction of about 10 μm or so as an anisotropic heat-conductive filler (second filler) were mixed to prepare a mixture. The volume ratio calculated by the density and the applied weights of the curable precursor, first and second fillers applied to the mixture was about 50:10:40 (=curable precursor:first filler:second filler) or so. The prepared mixture was poured into a film-shaped Teflon mold (thickness: about 1 mm) and cured at a temperature of 120° C. for 30 minutes or so, while applying a magnetic field in the upper and lower directions of the film form at an intensity of about 700 to 800 Gauss by a neodymium magnet, to form a film-shaped composite material. FIG. 2 is a cross-sectional photograph of the composite material formed as described above. As shown in the drawing, while the composite filler is oriented in the vertical direction (magnetic field direction, thickness direction) to form heat transfer paths, the boron nitride filler oriented in the substantially horizontal direction connects the heat transfer paths to form a network. The thermal conductivity of such a composite material in the Z-axis direction (thickness direction) was about 5.8 W/mK.

The thermal conductivity was determined by obtaining the thermal diffusivity (A), specific heat (B) and density (C) of the composite material and substituting them into an equation of thermal conductivity=A×B×C, where the thermal diffusivity was measured with a laser flash method (LFA equipment, model name: LFA467), the specific heat was measured by way of DSC (differential scanning calorimeter) equipment and the density was measured with Archimedes method.

Figure 3:
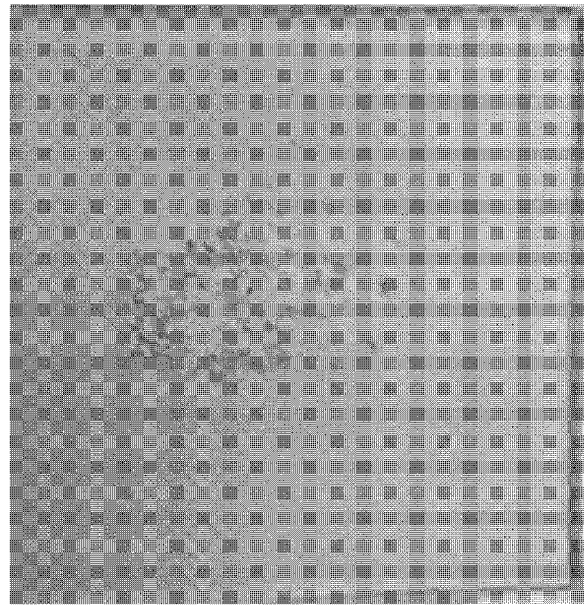

On the other hand, FIG. 3 is a photograph of the surface of the produced composite material, and it can be confirmed that defects on the surface hardly appear as compared with the case of Comparative Example 2.

Comparative Example 1

A composite material was produced in the same manner as in Example 1, except that the mixture was prepared so that the volume ratio of the curable precursor to the first filler of Production Example 1 was 1:1 without applying the second filler, that is, the filler not combined with the magnetic body. The thermal conductivity of the composite thus produced in the Z-axis direction (thickness direction) was about 2.5 W/mK.

Comparative Example 2

Figure 4:
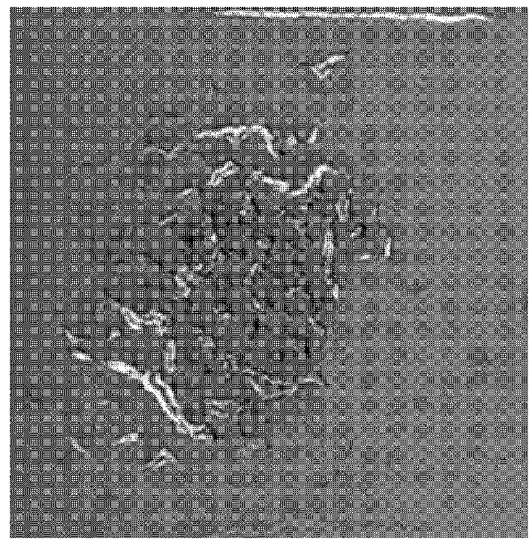
FIG. 4 is a photograph of the composite material produced in Comparative Example 2.

A composite material was produced in the same manner as in Example 1, except that the mixture was prepared so that the volume ratio calculated by the density and the applied weights of the curable precursor, the first and second fillers was about 50:40:10 (=curable precursor:first filler:second filler). FIG. 4 is a photograph of the surface of the produced composite material, and a large defect was confirmed as shown in the drawing.

Comparative Example 3

A composite material was prepared in the same manner as in Example 1, except that the mixture was prepared so that the volume ratio of the curable precursor and the second filler was about 3:7 or so without applying the first filler, that is, the filler combined with the magnetic body. The thermal conductivity of the composite thus produced in the Z-axis direction (thickness direction) was about 2.4 W/mK.

What is claimed is:

1. A composite material comprising a polymer matrix and a thermal conductor,
    wherein the thermal conductor comprises a first anisotropic heat-conductive filler combined with a magnetic body and a second anisotropic heat-conductive filler not combined with the magnetic body,
    wherein a volume of the thermal conductor in the composite material is 55 vol % or less of the composite material,
    wherein a ratio of a volume of the first anisotropic heat-conductive filler to a volume of the second anisotropic heat-conductive filler is 1 or less,
    wherein the first and second anisotropic heat-conductive fillers each independently have an aspect ratio of 35 or mnres,
    wherein the first and second anisotropic heat-conductive fillers each independently have an average particle diameter of the cross section in a range of from about 6 μm to 100 μm,
    wherein the first and second anisotropic heat-conductive fillers each independently are alumina, aluminum nitride (AlN), boron nitride (BN), silicon nitride or beryllium oxide (BeO) (BeO),
    wherein the magnetic body is iron oxide, ferrite or alloy nanoparticles, and
    wherein the first anisotropic heat conductive filler is oriented to form heat transfer paths and the second anisotropic heat-conductive filler connects the heat transfer paths.

2. The composite material according to claim 1, wherein the composite material is in the form of a film, and the first anisotropic heat-conductive filler is oriented in a thickness direction of the film to form the heat transfer paths.

3. The composite material according to claim 2, wherein a thickness of the film form is at least 10 μm.

4. The composite material according to claim 2, wherein a thermal conductivity measured along the thickness direction of the film is at least 4 W/mK.

5. The composite material according to claim 1, wherein the composite material is in the form of a film, and a thermal conductivity measured along a thickness direction of the film is at least 0.3 W/mK.

6. The composite material according to claim 1, wherein the polymer matrix comprises one or more selected from the group consisting of an acrylic resin, a silicone resin, an epoxy resin, a urethane resin, an amino resin, a polyester, an olefin resin and a phenol resin.

7. The composite material according to claim 1, wherein the first or second anisotropic heat-conductive filler has an average particle diameter of the cross section in a range of from about 10 μm to 100 μm.

8. The composite material according to claim 1, wherein the magnetic body has an average particle diameter in a range of from about 10 nm to 1,000 μm.

9. The composite material according to claim 1, wherein the ratio of the volume of the first anisotropic heat-conductive filler to the volume of the second anisotropic heat-conductive filler is 0.5 or less.

10. The composite material according to claim 1, wherein the second anisotropic heat-conductive filler is perpendicular to the first anisotropic heat-conductive filler.

11. The composite material according to claim 1, wherein the magnetic body is iron oxide, and the first anisotropic heat-conductive filler and/or the second anisotropic heat-conductive filler is boron nitride.

12. A method for producing the composite material of claim 1, the method comprising:
   curing a curable precursor of the polymer matrix, said curing carried out while applying a magnetic field to a mixture comprising the curable precursor, the first anisotropic heat-conductive filler combined with the magnetic body, and the second anisotropic heat-conductive filler not combined with the magnetic body, to orient the first anisotropic heat-conductive filler combined with the magnetic body,
   to thereby form the composite material comprising the polymer matrix and the thermal conductor.

13. The method of claim 12, wherein the first anisotropic heat-conductive filler is oriented in a direction of the applied magnetic field, and wherein the second anisotropic heat-conductive filler is not affected by the applied magnetic field.

* * * * *